(12) United States Patent
Ishida et al.

(10) Patent No.: US 12,443,916 B2
(45) Date of Patent: Oct. 14, 2025

(54) METHOD OF HOUSEHOLD ITEM INVENTORY MANAGEMENT

(71) Applicant: INTERNATIONAL BUSINESS MACHINES CORPORATION, Armonk, NY (US)

(72) Inventors: Allison Kei Ishida, Alameda, CA (US); Su Liu, Austin, TX (US); Diana Isabelle Ovadia, Camarillo, CA (US); Chloe McCracken, West Harrison, IN (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/822,448

(22) Filed: Aug. 26, 2022

(65) Prior Publication Data
US 2024/0070607 A1    Feb. 29, 2024

(51) Int. Cl.
*G06Q 10/087*    (2023.01)
*G06Q 30/0601*    (2023.01)

(52) U.S. Cl.
CPC ....... *G06Q 10/087* (2013.01); *G06Q 30/0639* (2013.01)

(58) Field of Classification Search
CPC .. G06Q 10/087; G06Q 30/0639; G06Q 10/08; G06V 20/20
See application file for complete search history.

(56) References Cited

U.S. PATENT DOCUMENTS

| 7,065,501 | B1 | 6/2006 | Brown |
| 8,296,259 | B1 | 10/2012 | Trandal |
| 9,357,348 | B2 | 5/2016 | Evans |
| 9,997,043 | B2 | 6/2018 | Kazerouni |
| 10,032,051 | B2 | 7/2018 | Fan |
| 2012/0101876 | A1 | 4/2012 | Turvey |

(Continued)

FOREIGN PATENT DOCUMENTS

| CN | 119731674 A | 3/2025 |
| EP | 4577959 A1 | 7/2025 |

(Continued)

OTHER PUBLICATIONS

NPL_Boldt_2014 found at https://elib.unistuttgart.de/bitstream/11682/3380/1/BCLR_0091.pdf (accessed Sep. 29, 2024) (Year: 2014).*

(Continued)

*Primary Examiner* — Florian M Zeender
*Assistant Examiner* — Kimberly S. Bursum
(74) *Attorney, Agent, or Firm* — Robert D. Bean

(57) ABSTRACT

According to one embodiment, a method, computer system, and computer program product for item management is provided. The present invention may include identifying all items within sensor feeds of a sensor set within a venue; creating a list comprising entries for the identified items, the entries comprising a name, location and presence of the items; based on continuously monitoring the sensor feeds, dynamically updating the list to track the location and/or presence of the items in real time; responsive to receiving a query from a user requesting a lost item, selecting an item in the list that matches the name of the lost item; and guiding the user to the location of the selected item.

14 Claims, 3 Drawing Sheets

(56) References Cited

U.S. PATENT DOCUMENTS

| | | | |
|---|---|---|---|
| 2015/0243158 A1 | 8/2015 | Bassan-Eskenazi | |
| 2016/0028917 A1 | 1/2016 | Wexler | |
| 2018/0218582 A1* | 8/2018 | Hodge | H04N 21/44004 |
| 2020/0175302 A1* | 6/2020 | DeLuca | G06T 1/0007 |
| 2022/0331047 A1* | 10/2022 | Shelton, IV | G16H 20/40 |
| 2023/0123242 A1* | 4/2023 | Sahu | G01C 21/383 |
| | | | 701/424 |
| 2023/0179955 A1* | 6/2023 | Williams | A61B 5/4833 |
| | | | 455/456.1 |
| 2024/0054191 A1* | 2/2024 | Weaver | G06F 21/30 |

FOREIGN PATENT DOCUMENTS

| | | |
|---|---|---|
| KR | 20120111180 A | 10/2012 |
| KR | 20210048892 A | 5/2021 |
| WO | 2024/042392 A1 | 2/2024 |

OTHER PUBLICATIONS

Araujo, et al., "How to Make an Easy Home Inventory List for Insurance," thebalance.com [online], [Oct. 27, 2021 accessed on Jul. 12, 2022], 11 pages, Retrieved from the Internet: <URL: https://www.thebalance.com/making-a-home-inventory-list-for-insurance-4166000>.

Disclosed Anonymously, "A System and method to locate luggage using augmented reality and object tracking technology," IP.com, Nov. 15, 2016, 4 pages, IP.com No. IPCOM000248303D, Retrieved from the Internet: <URL: https://priorart.ip.com/IPCOM/000248303>.

Disclosed Anonymously, "Automatic Object Tracking," IP.com, Sep. 7, 2018, 23 pages, IP.com No. IPCOM000255187D, Retrieved from the Internet: <URL: https://priorart.ip.com/IPCOM/000255187>.

Disclosed Anonymously, "Method for Providing Augmented Reality Item Searching," IP.com, Nov. 5, 2012, 3 pages, IP.com No. IPCOM000223112D, Retrieved from the Internet: <URL: https://priorart.ip.com/IPCOM/000223112>.

Disclosed Anonymously, "Object Location System," IP.com, Jan. 24, 2017, 4 pages, IP.com No. IPCOM000248963D, Retrieved on the Internet: <URL: https://priorart.ip.com/IPCOM/000248963>.

IBM, "IBM Maximo Application Suite: Remote monitoring," IBM.com [online], [accessed on Jul. 19, 2022], 6 pages, Retrieved from the Internet: <URL: https://www.ibm.com/products/maximo/remote-monitoring>.

IBM, "IBM Watson Health is now Merative™," IBM.com, [accessed on Jul. 19, 2022], 11 pages, Retrieved from the Internet: <URL: https://www.ibm.com/watson-health?p1=Search&p4=43700050370588687&p5=b&gclid=Cj0KCQjwgtWDBhDZARIsADEKwgOfibo8n15g8mG0qG1Si-i9VkjsP_ww1nOomGjBh7o-Z_Niyzy03SwaAt4mEALw_wcB&gclsrc=aw.ds>.

Kamarudin, et al., "A New Framework of Smart System for Inventory Management, Stock Item Locator and Navigation," 2021 International Conf. on Computer & Information Sciences (ICCOINS), Jul. 2021, pp. 142-145, IEEE, Kuching, MY, DOI: 10.1109/ICCOINS49721.2021.9497209, Retrieved from the Internet: <URL: https://ieeexplore.ieee.org/document/9497209>.

Kharpal, "Amazon's voice assistant Alexa could be a $10 billion 'mega-hit' by 2020: Research," CNBC.com [online], Mar. 10, 2017 [accessed on Jul. 19, 2022], 6 pages, Retrieved from the Internet: <URL: https://www.cnbc.com/2017/03/10/amazon-alexa-voice-assistan-could-be-a-10-billion-mega-hit-by-2020-research.html>.

Rutledge, "Automated Physical Asset Location via Remotely Modulated Devices," IP.com, Oct. 18, 2012, 3 bages, Yahoo! 2012, IP.com No. IPCOM000222580D, Retrieved from the Internet: <URL: https://priorart.ip.com/IPCOM/000222580>.

Yaskevich, "Augment Your Sales with Augmented Reality Retail Apps," ScineceSoft.com [online], Oct. 15, 2018 [accessed on Jul. 19, 2022], 8 pages, Retrieved from the Internet: <URL: https://www.scnsoft.com/blog/augmented-reality-in-retail>.

International Searching Authority, "Notification of Transmittal of the International Search Report and the Written Opinion of the International Searching Authority, or Declaration," Patent Cooperation Treaty, Jul. 19, 2023, 12 pages, International Application No. PCT/IB2023/057371.

* cited by examiner

METHOD OF HOUSEHOLD ITEM INVENTORY MANAGEMENT

BACKGROUND

The present invention relates, generally, to the field of computing, and more particularly to mixed reality.

Mixed reality is a field concerned with merging real and virtual worlds such that physical and digital objects co-exist and interact in real time. Mixed reality does not exclusively take place in either the physical or virtual worlds, but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has found practical applications in such areas as remote working, construction, gaming, and military, academic and commercial training.

SUMMARY

According to one embodiment, a method, computer system, and computer program product for item management is provided. The present invention may include identifying all items within sensor feeds of a sensor set within a venue; creating a list comprising entries for the identified items, the entries comprising a name, location and presence of the items; based on continuously monitoring the sensor feeds, dynamically updating the list to track the location and/or presence of the items in real time; responsive to receiving a query from a user requesting a lost item, selecting an item in the list that matches the name of the lost item; and guiding the user to the location of the selected item.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
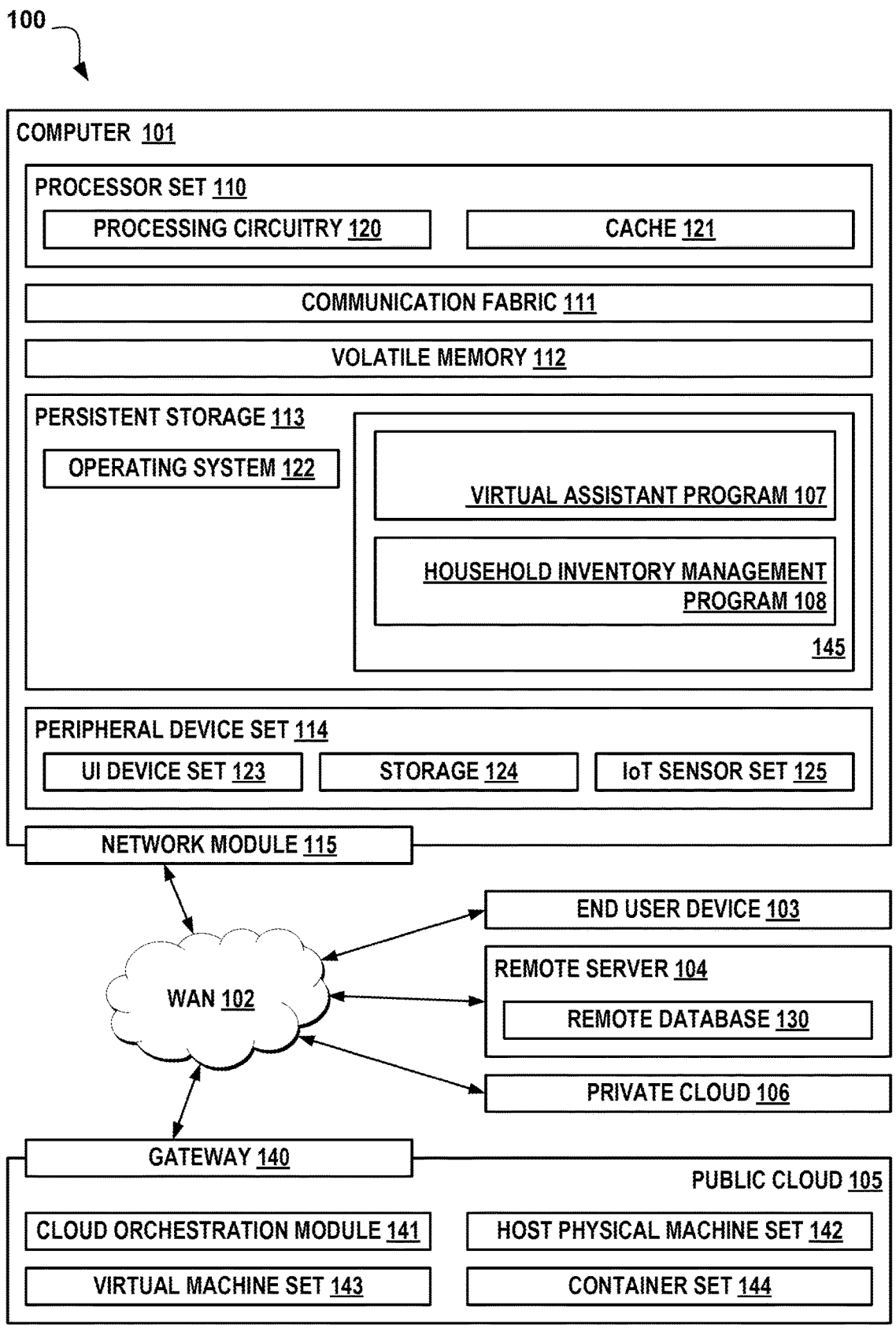
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed reality. The following described exemplary embodiments provide a system, method, and program product to, among other things, identify items in a location via sensors, create a list of the items, dynamically update the list with item locations, and responsive to a user query regarding an item, highlighting that item in mixed reality based on the location information in the list.

As previously described, mixed reality is a field concerned with merging real and virtual worlds such that physical and digital objects co-exist and interact in real time. Mixed-reality systems use software to generate images, sounds, haptic feedback, and other sensations to augment a real-world environment. While the creation of this augmented environment can be achieved with mobile devices such as cell phones or tablets, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable.

People are always losing things. The average person may lose thousands of items throughout their lifetime, and may spend, in the aggregate, days or even weeks of their lives searching for those lost items. There have been a number of solutions attempted in order to help a forgetful individual locate lost items. One such approach involves the use of tracking devices such as keyring locators based on Bluetooth, devices such as RFID tags and even larger GPS tracking devices attached to frequently lost items, et cetera. However, these solutions require tracking devices be attached to any given object that might be lost. To put a tracker on only objects a person expects to lose would be expensive, bulky and inconvenient; to put a tracker on all objects that might need to be found would be nearly impossible.

Other attempted solutions may use cameras or other devices to locate an item once it has been identified as missing. However, this method is imperfect in that tracking down an object once it is determined to be lost may be a time-consuming and unreliable process without knowledge of where the item was prior to being identified as lost. Additionally, attempted solutions may attempt to communicate the location of a lost item using images, audible or textual descriptions, et cetera; these may be flawed methods of communication and may not accurately convey the location of the lost item to the user. A mixed-reality device may be better suited to communicate the location of a lost object by highlighting that object within the venue to the user, such that it becomes plainly visible to the user even through walls and other objects. As such, it may be advantageous to, among other things, implement a system that automatically creates a list of all items within a venue based on sensor data gathered within that venue, dynamically updates the list with the location and presence within the venue of those items based on the sensor data, and utilizes the list to identify the presence and/or location of an item within the venue when a user asks for the location of that item, and highlights that item within the venue using mixed reality. Such a method would not require bulky and expensive tracking hardware and would therefore be cheaper and more convenient, would possess a superior capability in communicating the location of the lost item to the user, and would have the item's data on hand and so would be faster than attempted methods in the art.

According to at least one embodiment, the invention may be a method of creating and maintaining a list of items within a venue using a set of sensors.

In embodiments of the invention, the venue may be any discretely bounded geographical location, such as a household, factory, store, et cetera, which comprises a number of items and a set of sensors. The area comprising the venue may be delineated by a geofence, which may be a virtual perimeter describing the real-world geographic area that defines the geographical location of the venue. The geofence may be pre-provided to the system by a user or human admin or programmer. The user may be any individual within the venue and/or associated with the venue who wants to locate items. In embodiments of the invention, the user may own the venue, may own the items, may own and/or exclusively or jointly control the sensor set.

The items may be any physical objects associated with a venue or with a user that a user might wish to find, such as a cell phone, a breakfast sandwich, keys, industrial tools, instruction manuals, et cetera, and which are currently within the venue or were within the venue at some time in the past. The items may be owned and/or associated with the user, with individuals of a group of users, and/or owned and/or associated with individuals that are not users. In some embodiments, the items may only comprise objects that are small enough to be portable; for example, smaller than a threshold size and/or lighter than a threshold weight, wherein the threshold size and weight represent a value of size and weight respectively above which an item is no longer considered portable. Larger, non-portable items may not be carried or moved often, and therefore are much less likely to be misplaced as a result.

The set of sensors may be one or more internet of things (IoT) devices which may be located within the venue, and may be capable of gathering data on the environment within the venue, including regarding objects disposed within the venue, and transmitting that data to the system. The sensors may be installed in static locations within the venue, and/or may be attached to devices within the venue which may be mobile, such as a cell phone or tablet, and/or which may move around the venue and which may exit or enter the venue. The set of sensors may comprise infrared and/or optical cameras, and may additionally comprise accelerometers, GPS receivers, motion sensors, sonar/lidar emitters, et cetera, and may be integrated into mobile devices such as laptops, tablets and cell phones, wearables such as smartwatches and MR headsets, and/or stationary devices such as wall-mounted security cameras, webcams, desktop computers, et cetera. The set of sensors may be owned and/or exclusively controlled and/or accessed by the user, may be owned and/or controlled by a plurality of individuals including the user, may be publicly controlled and/or accessed, may be owned/and or exclusively controlled by a plurality of users, et cetera.

In embodiments of the invention, the system may create a list of items by monitoring data from the set of sensors. The system may use optical recognition to identify all items or all portable items within camera footage taken within the venue. The system may retrieve or be provided with a reference list of generic objects, which may comprise the name and physical description of each of a number of generic objects, including, for example, the size, weight, color, et cetera of the generic objects. The system may search for candidate items within frames comprising camera feeds of the sensor data, and may identify objects as candidate items if the object visually matches a generic object on the initial list. In some embodiments of the invention, the system may continually monitor the sensor data for objects that have entered the venue, such that objects may be identified and added to the list in real time or near-real-time as they are brought into the venue.

The terms "real-time," "near-real-time," and "dynamic" herein refer to computer processes that execute on a timescale on the order of milliseconds in response to information being received, such that any delay between the receipt of information and the output of the Real The term "real-time" colloquially describes a human sense of time (rather than machine time) that seems immediate, but should be understood herein to refer to a guaranteed level of computer responsiveness within a specified time constraint, on the order of milliseconds or microseconds, between an event and the response deadline marking the bounds of the specified time constraint. Real-time updating of the list, therefore, may appear to a human to smoothly track the motion of an item, although in actuality several milliseconds may have elapsed between updates. In contrast to mainframe batch computers, where processes may be grouped and scheduled for processing at later times, real-time computer processes may occur without delay beyond transmission and processing times. In some embodiments of the invention, for example where it may be desirable to decrease resource usage, the system may introduce a delay into the execution of a computer process such that it no longer could be said to occur in real-time, but rather occurs at continuous and regular intervals spaced out on the order of milliseconds or microseconds; such an embodiment may be referred to herein as occurring in near-real-time. However, any embodiments on the spectrum between real-time execution and execution occurring at intervals on the order of five minutes may still be referred to herein as "dynamic."

In some embodiments of the invention, if an identified object does not match any generic objects in the reference list, the system may prompt the user to identify the identified object, such as through highlighting the object in mixed reality, making an audible request to the user using synthesized and/or pre-recorded speech, sending a text and/or graphical prompt to a display-equipped computing device associated with the user, et cetera. The prompt may request the object's name and/or physical description. The system may then receive the user's answer through, for example, a textual or audible response to the prompt transmitted to the system and/or received through one or more microphones comprising the sensor set. The system may enter the object into the list as an item under the provided name and with the provided description. In some embodiments of the invention, the system may prompt the user to identify whether or not an object should be counted as an item, and if it should be included in the list.

If a detected object matches a generic object in the reference list, and/or is identified to the system by a user in response to a prompt, the object may thereby be designated as a candidate item. The system may add the candidate item to the list as an item with the description provided by the reference list and/or by the user, as well as a location and position of the object as identified by the sensor set. In embodiments of the invention, the system may determine, based on the size and/or weight of the corresponding generic object in the description from the reference list, that a candidate item is too large or too heavy to be portable, and may exclude that candidate item from being entered into the list.

In some embodiments of the invention, the system may assign a priority to items in the list. The priority associated with the item may reflect the importance that item to the user, and by extension the importance that the item be quickly found once lost. For example, the user's cell phone may be an item which the user relies on heavily in her day-to-day life. As such, the cell phone item may be rated as "high priority." Likewise, a tool such as a fire extinguisher may be rarely used but may be absolutely crucial to find quickly when needed, and so may also be "high-priority." The system may base its assessment of the priority of an item on patterns of use for that item identified by a machine learning model based on sensor data from the sensor set.

In some embodiments of the invention, the system may assign a loss rating to items. The loss rating may indicate the likelihood that an item may be lost or that a user may need to find the item. For example, a tool such as a socket wrench set may be rarely used and therefore unlikely to be misplaced or moved; the system may accordingly assign a low loss rating to the socket wrench set item. On the other hand, an item such as a favorite hair tie may be an item which the user uses daily, and is therefore very likely to be misplaced; the system may accordingly assign a high loss rating to the hair tie item. The system may base its assessment of the priority of an item on patterns of use for that item identified by a machine learning model based on sensor data from the sensor set.

In embodiments of the invention, the system may maintain the list of items by continually monitoring the sensor data to detect movement of items, and by dynamically updating the locations and positions of list items in real-time or in near-real-time as the items are moved within the venue. The system may analyze live camera feeds from the sensor set to identify the position of items and modify the list with updated locations and positions of items as the items are moved. In some embodiments, the system may analyze regions of sensor feeds recorded from stationary cameras for movement, and may only update location and position of items visible in regions of the sensor feed where movement is detected. In some embodiments of the invention, the system may prioritize monitoring and updating the location of items in order of highest to lowest priority and/or highest to lowest loss rating, such that changes in the location and/or position of high priority and/or high loss rated items are detected and/or updated in the list first. In some embodiments of the invention, the system may detect when an item has entered or left the venue, for example by determining based on the position of an item that the item has crossed a geofence marking the perimeter of the venue. The system may update the list to reflect whether the item is inside or outside of the venue. In some embodiments of the invention, the system may feed the position and location of items into a machine learning algorithm to derive patterns of use for different items. Patterns of use may include the times of day that the items are moved, where the items are moved, frequency with which a user interacts with items, times when an item exits and/or enters the venue, et cetera.

In embodiments of the invention, if the system has previously identified an item, but the item is no longer at a previously recorded location and the system cannot identify the current location of the item, the system may prompt a user to locate the item and provide the location to the system, for example by describing the location of the item, taking a video of the item, indicating the item within view of a camera of the sensor set, et cetera. In some embodiments of the invention, for example where the list comprises priority and/or loss ratings, the system may only prompt the user to locate high-priority and/or high loss rated items, or may prompt the user with a frequency and/or urgency commensurate with the priority and/or loss rating of the item.

According to at least one embodiment, the invention may be a method of identifying a lost item within the list in response to a user query, and guiding the user to the lost item using mixed reality.

In embodiments of the invention, the user query may be a textual request transmitted to the system from a user's computing device such as a laptop, cell phone, tablet, et cetera, and/or may be an audible voice request made by the user and received at a microphone, for example integrated into a cell phone, voice assistant device, laptop, et cetera. The query may comprise a request to find a lost item, which may be an item that the user has misplaced and wishes to find.

In embodiments of the invention, a mixed reality session may be a discrete period of time where the user is interacting with a mixed reality experience through a mixed reality device. The mixed reality program may be a software program such as a training simulator, a game, a narrative experience such as a movie, a social platform, et cetera that creates or provides one or more mixed-reality experiences for the user to interact with through a mixed reality device. The mixed reality device, or mixed-reality capable device, may be any device or combination of devices enabled to record real-world information that the mixed reality program may overlay with computer-generated perceptual elements to create a mixed-reality reality environment experienced by the user; the mixed reality device may further record the actions, position, movements, et cetera of the user, to track the user's movement within and interactions with the mixed reality environment. The mixed reality device may display the mixed reality environment to the user. The mixed reality device may be equipped with or comprise a number of sensors such as a camera, microphone, accelerometer, et cetera which may comprise the sensor set, and/or may be equipped with or comprise a number of user interface devices such as displays, touchscreens, speakers, et cetera. In some embodiments, the mixed reality device may be a headset that is worn by the user.

In embodiments of the invention, the system may identify the lost item by retrieving the location and position data in the list of the list item corresponding to the item identified in the user query. If the system cannot find the lost item identified in the query, the system may request that the user describe the object, and may compare the user's description against the description in the list.

The system may guide the user to the item by highlighting or otherwise indicating the item by overlaying graphical elements onto the item within a mixed reality session currently experienced by the user. The system may prompt the user to initiate a mixed-reality session on a mixed-reality capable device of the user, such as a tablet or cell phone, and may indicate the missing object within that mixed reality session using graphical elements overlaid onto the position of the object. In some embodiments of the invention, the system may guide the user to the item by audibly or textually describing the location of the lost item to the user. If the lost item is not present in the venue, the system may inform the user, for example through a text box, audible speech message, and/or graphical elements, that the item is not within the venue. The system may further inform the user of the last time the item was within the venue, and/or its last known location, and/or the date, time, and/or place where the item left the venue.

In some embodiments of the invention, the system may store video segments recorded by a mixed reality device associated with the user; responsive to receiving a query from the user, the system may search for objects within the recorded video segments, from most recently recorded video segment to least recently recorded video segment, until the system has identified the lost item. The system may then play the recorded video segment back to the user on a display and/or in a mixed-reality environment to guide the user to the lost item or to communicate the last known position of the lost item to the user. As an example, Grandma Sadie uses her trowel in the garden of her security camera equipped house on Monday. The system monitors activities in view of the security cameras and saves the footage. The system analyzes the saved footage and recognizes the trowel within a segment of the recorded footage captured by the outside security cameras covering the garden. The system adds the location of the recognized trowel into a virtual household inventory list and updates the recorded footage with metadata indicating that the trowel is present in the footage, including the time and location within the footage where the trowel appears. Come Saturday, Grandma Sadie desires to garden again but has forgotten where she left the trowel. Grandma Sadie may ask the system, "Where is my trowel?" The system searches its household inventory list for the entry "trowel" and retrieves the most recent footage associated with the trowel entry. The system then activates the display on Grandma Sadie's tablet and plays back a video of the camera footage from the garden on Monday when Grandma Sadie was using the trowel.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify items in a location via sensors, create a list of the items, dynamically update the list with item locations, and responsive to a user query regarding an item, highlighting that item in mixed reality based on the location information in the list.

Referring now to FIG. 1, computing environment 100 contains an example of an environment for the execution of at least some of the computer code involved in performing the inventive methods, such as code block 145, which may comprise virtual assistant program 107 and household inventory management program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the virtual assistant program 107 may be one of any number of software agents capable of interacting with a user by means of text or audible speech and providing information or performing tasks based on the voice or text input of the user. Examples may include voice-based virtual assistants such as the Google Home® (Google Home® and all Google Home®-based trademarks and logos are trademarks or registered trademarks of Google Inc. and/or its affiliates), the Amazon Echo® (Amazon Echo® and all Amazon Echo®-based trademarks and logos are trademarks or registered trademarks of Amazon Technologies, Inc. and/or its affiliates), and Siri® (Siri® and all Siri®-based trademarks and logos are trademarks or registered trademarks of Apple Inc. and/or its affiliates). The virtual assistant program 107 need not necessarily be located on client computing device 102; the virtual assistant program 107 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, the virtual assistant program 107 may be distributed in its operation over any number or combination of the aforementioned devices. In some embodiments, virtual assistant program 107 may be stored and/or run on its own dedicated virtual assistant device, which may be a hardware device equipped with speakers and microphones enabled to receive voice-based user queries and respond with audible artificial human speech, which may be synthesized and/or comprised of pre-recorded segments.

According to the present embodiment, the household inventory management program 108 may be a program enabled to identify items in a location via sensors, create a list of the items, dynamically update the list with item locations, and responsive to a user query regarding an item, highlighting that item in mixed reality based on the location information in the list. The household inventory management program 108 may, when executed, cause the computing environment 100 to carry out an household inventory management process 300. The household inventory management process 300 may be explained in further detail below with respect to FIG. 3. In embodiments of the invention, the household inventory management program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, household inventory management program 108 may be distributed in its operation over any number or combination of the aforementioned devices.

Figure 2:
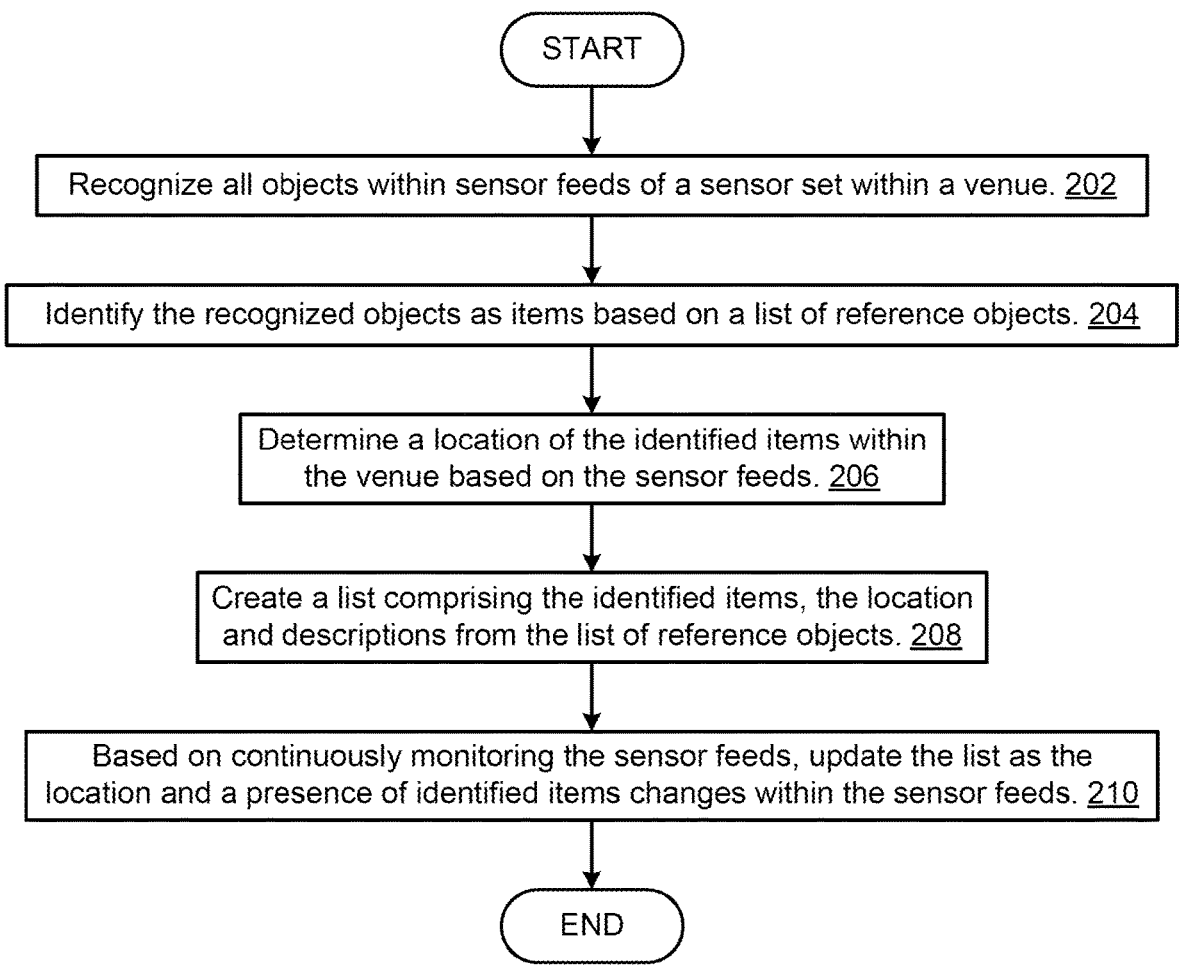
FIG. 2 is an operational flowchart illustrating an initial list creation process of a household inventory management process according to at least one embodiment.

Referring now to FIG. 2, an operational flowchart illustrating an initial list creation process 200 of a household inventory management process 300 is depicted according to at least one embodiment. At 202, the household inventory management program 108 may recognize all objects within sensor feeds of a sensor set within a venue. Objects may be physical objects, such as furniture, coffee mugs, paintings, et cetera. The sensor set may be one or more internet of things (IoT) devices which may be located within the venue, and may be capable of gathering data on the environment within the venue, including regarding objects disposed within the venue, and transmitting that data to the household inventory management program 108. The stream of gathered data conveyed from the sensor set to the household inventory management program 108 may be herein referred to as the sensor feeds. The sensor set may comprise any number and/or combination of infrared and/or optical cameras, and may additionally comprise accelerometers, GPS receivers, motion sensors, sonar/lidar emitters, et cetera, and may be integrated into mobile devices such as laptops, tablets and cell phones, wearables such as smartwatches and MR headsets, and/or stationary devices such as wall-mounted security cameras, webcams, desktop computers, et cetera.

The household inventory management program 108 may use image processing techniques, SONAR/LIDAR processing techniques, and other data processing techniques to extract information about the environment within the venue from the raw sensor data gathered by the sensor set. Specifically, the household inventory management process 300 may process the sensor data of the sensor feeds to recognize objects within the venue. The household inventory management process 300 may search through all available sensor feeds from the venue and use any object recognition techniques to recognize objects within the venue. Recognizing objects may entail, for example, flagging a region in an image or model of an area in the venue created from sensor data as containing an object. In some embodiments, for example where the list comprises only portable items, the household inventory management program 108 may only recognize objects below a certain size.

At 204, the household inventory management program 108 may identify the recognized objects as items based on a list of reference objects. The items may be any physical objects associated with a venue or with a user that a user might wish to find, such as a cell phone, a breakfast sandwich, keys, industrial tools, instruction manuals, et cetera, and which are currently within the venue or were within the venue at some time in the past. The household inventory management program 108 may retrieve or be provided with a reference list of generic objects, which may be a list, database, or other logical structure comprising the name and physical description of each of a number of generic objects, including, for example, the size, weight, color, et cetera of the generic objects. The household inventory management program 108 may compare recognized objects within the sensor feeds against the list of reference objects, and may identify objects as items if the recognized object visually matches a generic object on the initial list. In some embodiments, the items may only comprise objects that are small enough to be portable; for example, smaller than a threshold size and/or lighter than a threshold weight, wherein the threshold size and/or weight represent a value of size and/or weight respectively above which an item is no longer considered portable. The household inventory management program 108 may compare the size and/or weight of an item as identified in the description of the matching generic object from the reference list against a threshold size and/or weight; if the item meets or exceeds the threshold, the household inventory management program 108 may not add the item to the list.

At 206, the household inventory management program 108 may determine a location of the identified items within the venue based on the sensor feeds. The household inventory management program 108 may analyze the regions of the sensor feed containing identified items to determine a location and presence of the item. The household inventory management program 108 may identify the location of the item within the venue using, for example, image analysis techniques such as monoplotting, laser rangefinding techniques, sonar and lidar rangefinding techniques, et cetera. In some embodiments of the invention, for example, the household inventory management program 108 may use indoor localization and object measurement methods to identify the location of an item through image analysis. If the household inventory management program 108 knows a sensor's location and angle, the household inventory management program 108 may determine the object's location relative to the sensor because each frame/image in CCTV or other IoT device footage can include metadata. The metadata may include camera ID, location, time, et cetera.

At 208, the household inventory management program 108 may create a list comprising the identified items, the location and descriptions from the list of reference objects. The list may be a list, database, or other logical structure comprising an entry for every item identified within sensor feeds of the sensor set within the venue, along with the name of that item, an indicator representing whether the item is present in the venue, and if the item is present, the location of that item within the venue. Each entry of an item may additionally comprise a physical description provided by the reference list and/or the user, a web service, a human admin, et cetera, alternate names for the item if the item can be referred to in multiple different ways, et cetera. In some embodiments, entries for items in the list may further comprise video recordings, or links to video recordings, recorded while the user was experiencing a mixed reality session within the venue, within which the item is visible.

At 210, the household inventory management program 108 may, based on continuously monitoring the sensor feeds, update the list as the location and a presence of identified items changes within the sensor feeds. The household inventory management program 108 may analyze live sensor feeds from the sensor set to identify the position of items and modify the list with updated locations of items as the items are moved. In some embodiments, the household inventory management program 108 may analyze only those regions of sensor feeds recorded from stationary sensors where movement is detected, and may only update location of items in regions of the sensor feed where movement is detected. In some embodiments of the invention, the household inventory management program 108 may continually monitor the sensor data to recognize new objects that have entered the venue, such that the new objects may be identified as items and added to the list in real time or near-real-time as they are brought into the venue. Likewise, the household inventory management program 108 may continually monitor the sensor data to recognize previously identified items that have entered the venue after having left the venue in the past, such that the presence data of the previously identified item may be updated in the list to reflect that the item is now present in the venue in real time or near-real-time as the item is brought into the venue. The household inventory management program 108 may continually monitor the sensor data to identify that items have left the venue, and update the presence data of the departing item in the list in real time or near-real-time to reflect that the item has left the venue as the item leaves the venue.

The household inventory management program 108 may generate a 3D model of the venue and/or the regions monitored by the sensor set based on the sensor feeds, and may track and represent items from the list within the 3D model. The household inventory management program 108 may update regions of the 3D model that are not covered by static sensors by operating moveable sensors and/or by recording sensor data from mobile devices moving through the venue, for example those used or held by the user or other explicitly consenting participants.

In some embodiments of the invention, the household inventory management program 108 may assign a priority to items in the list. The priority associated with the item may reflect the importance that item to the user, and by extension the importance that the item be quickly found once lost. The household inventory management program 108 may base its assessment of the priority of an item on patterns of use for that item identified by a machine learning model based on sensor data from the sensor set. In some embodiments of the invention, the household inventory management program 108 may assign a loss rating to items. The loss rating may indicate the likelihood that an item may be lost or that a user may need to find the item. The household inventory management program 108 may base its assessment of the priority of an item on patterns of use for that item identified by a machine learning model based on sensor data from the sensor set. In some embodiments of the invention, the household inventory management program 108 may prioritize monitoring and updating the location of items in order of highest to lowest priority and/or highest to lowest loss rating, such that changes in the location and/or position of high priority and/or high loss rated items are detected and/or updated in the list first.

In embodiments of the invention, if the household inventory management program 108 has previously identified an item, but the item is no longer at a previously recorded location and the household inventory management program 108 cannot identify the current location of the item for a pre-determined period of time, the household inventory management program 108 may prompt a user to locate the item and provide the location to the household inventory management program 108.

Figure 3:
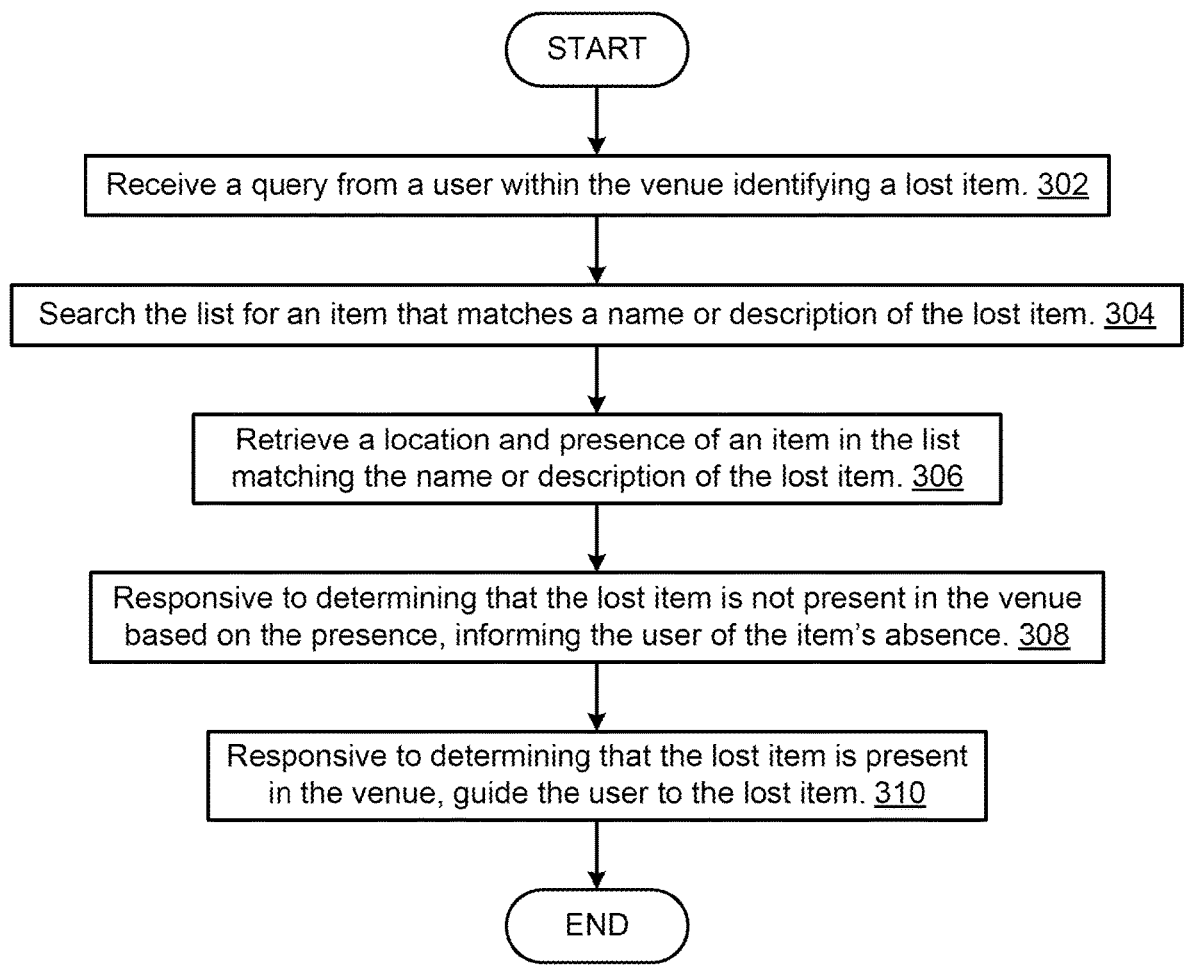
FIG. 3 is an operational flowchart illustrating a household inventory management process according to at least one embodiment.

Referring now to FIG. 3, an operational flowchart illustrating a household inventory management process 300 is depicted according to at least one embodiment. At 302, the household inventory management program 108 may receive a query from a user within the venue identifying a lost item. The user query may be a textual request transmitted to the household inventory management program 108 from a user's computing device such as a laptop, cell phone, tablet, et cetera, and/or may be an audible voice request made by the user and received at a microphone, for example integrated into a cell phone, voice assistant device, laptop, et cetera. The query may comprise a request to find a lost item, which may be an item that the user has misplaced and wishes to find. The query may alternatively or additionally comprise a description of an object, for example where the user has forgotten both the object and the name of the object, but remembers what it looks like.

At 304, the household inventory management program 108 may search the list for an item that matches a name or description of the lost item. The household inventory management program 108 may use database searching techniques to find exact matches of the name and/or description of the item within the list. If there are no exact matches, the household inventory management program 108 may utilize text processing techniques to identify names and/or descriptions of items in the list falling within a threshold level of similarity to the name/description of the lost item identified in the query.

At 306, the household inventory management program 108 may retrieve a location and presence of an item in the list matching the name or description of the lost item. Having identified a match, the household inventory management program 108 may retrieve the presence and/or location data from the entry corresponding to the item with a name and/or description matching the lost item. If the item is not present in the venue, there may be no location data to retrieve.

At 308, the household inventory management program 108 may, responsive to determining that the lost item is not present in the venue based on the presence, informing the user of the item's absence. If the presence data indicates that the lost item is no longer within the venue, the household inventory management program 108 may inform the user, through for example a graphical, textual, or audible prompt, that the item is not in the venue. In some embodiments, the household inventory management program 108 may inform the user where the item was last spotted within sensor feeds, the route by which the item left the venue, patterns of movement of the item, et cetera, for example by displaying a 3D model to the user. The household inventory management program 108 may inform the user of the last time the item was within the venue, and/or the date and/or time when the item left the venue. In some embodiments, the household inventory management program 108 may offer to display the last known location of the item to the user in mixed reality, and may prompt the user to begin a mixed reality session. If the user is in a mixed reality session, the household inventory management program 108 may display the most recent recordings taken while the user was in a previous mixed reality session where the item is visible.

At 310, the household inventory management program 108 may, responsive to determining that the lost item is present in the venue, guide the user to the lost item. The household inventory management program 108 may guide the user to the item by highlighting or otherwise indicating the item by overlaying graphical elements onto the item within a mixed reality session currently experienced by the user. The household inventory management program 108 may prompt the user to initiate a mixed-reality session on a mixed-reality capable device of the user, such as a tablet or cell phone, and may indicate the missing object within that mixed reality session using graphical elements overlaid onto the position of the object. In some embodiments of the invention, the household inventory management program 108 may guide the user to the item by audibly or textually describing the location of the lost item to the user. In some embodiments, for example where the lost item is present, or where the household inventory management program 108 has not determined the item to have left the venue but does not currently know the location of the item within the venue, the household inventory management program 108 may offer to display the last known location of the item to the user in mixed reality, and may prompt the user to begin a mixed reality session. If the user is in a mixed reality session, the household inventory management program 108 may display the most recent video recordings taken while the user was in a previous mixed reality session where the item is visible. In some embodiments of the invention, the household inventory management program 108 may guide the user to the item by remotely operating an autonomous device, such as a small remote-controlled car, a lightweight drone, a robot dog, et cetera, to lead the user on a path to the item and indicate the item to the user.

It may be appreciated that FIGS. 2-3 provide only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for item management, the method comprising:
   gathering real-time sensor feeds of a venue using one or more Internet of Things (IoT) sensors comprising one or more mobile sensors and one or more static sensors disposed within the venue, wherein the IoT sensors comprise a sensor set;
   identifying, using image processing techniques, all items within the sensor feeds of the sensor set;
   creating a list comprising entries for the identified items, the entries comprising a name, location and presence of the items;
   responsive to detecting movement within one or more regions of the sensor feeds from the one or more static sensors, updating the list to track the location and the presence of one or more of the items visible within the one or more regions;
   responsive to receiving a query from a user requesting a lost item, selecting an item in the list that matches the name of the lost item; and
   guiding the user to the location of the selected item.

2. The method of claim 1, wherein the updating further comprises:
   updating the presence of an item of the items responsive to detecting that the item has crossed a geofence delineating a perimeter of the venue.

3. The method of claim 1, wherein guiding the user to the location of the selected item further comprises:
   highlighting the location of the selected item with graphical elements in a mixed-reality environment.

4. The method of claim 1, further comprising:
   responsive to receiving the query from the user, displaying a recorded mixed reality session wherein the lost item was last seen to the user.

5. The method of claim 1, further comprising:
   responsive to losing track of the location of an item of the items for a pre-determined period of time, prompting the user to locate the item.

6. A computer system for item management, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   gathering real-time sensor feeds of a venue using one or more Internet of Things (IoT) sensors comprising one or more mobile sensors and one or more static sensors disposed within the venue, wherein the IoT sensors comprise a sensor set;
   identifying, using image processing techniques, all items within the sensor feeds of the sensor set;
   creating a list comprising entries for the identified items, the entries comprising a name, location and presence of the items;
   responsive to detecting movement within one or more regions of the sensor feeds from the one or more static sensors, updating the list to track the location and the presence of one or more of the identified items visible within the one or more regions;
   responsive to receiving a query from a user requesting a lost item, selecting an item in the list that matches the name of the lost item; and
   guiding the user to the location of the selected item.

7. The computer system of claim 6, wherein the updating further comprises:
   updating the presence of an item of the items responsive to detecting that the item has crossed a geofence delineating a perimeter of the venue.

8. The computer system of claim 6, wherein guiding the user to the location of the selected item further comprises:
   highlighting the location of the selected item with graphical elements in a mixed-reality environment.

9. The computer system of claim 6, further comprising:
   responsive to receiving the query from the user, displaying a recorded mixed reality session wherein the lost item was last seen to the user.

10. The computer system of claim 6, further comprising:
    responsive to losing track of the location of an item of the items for a pre-determined period of time, prompting the user to locate the item.

11. A computer program product for item management, the computer program product comprising:
    one or more computer-readable tangible storage medium and program instructions stored on at least one of the one or more tangible storage medium, the program instructions executable by a processor to cause the processor to perform a method comprising:
    gathering real-time sensor feeds of a venue using one or more Internet of Things (IoT) sensors comprising one or more mobile sensors and one or more static sensors disposed within the venue, wherein the IoT sensors comprise a sensor set;
    identifying, using image processing techniques, all items within the sensor feeds of the sensor set;
    creating a list comprising entries for the identified items, the entries comprising a name, location and presence of the items;
    responsive to detecting movement within one or more regions of the sensor feeds from the one or more static sensors, updating the list to track the location and the presence of one or more of the items visible within the one or more regions;
    responsive to receiving a query from a user requesting a lost item, selecting an item in the list that matches the name of the lost item; and
    guiding the user to the location of the selected item.

12. The computer program product of claim 11, wherein the updating further comprises:
    updating the presence of an item of the items responsive to detecting that the item has crossed a geofence delineating a perimeter of the venue.

13. The computer program product of claim 11, wherein guiding the user to the location of the selected item further comprises:

highlighting the location of the selected item with graphical elements in a mixed-reality environment.

14. The computer program product of claim 11, further comprising:
responsive to receiving the query from the user, displaying a recorded mixed reality session wherein the lost item was last seen to the user.

* * * * *